United States Patent
Lawrence

(10) Patent No.: US 12,498,243 B2
(45) Date of Patent: Dec. 16, 2025

(54) NAVIGATION ROUTES FOR VEHICLES

(71) Applicant: Intel Corporation, Santa Clara, CA (US)

(72) Inventor: Sean Lawrence, Bangalore (IN)

(73) Assignee: Intel Corporation, Santa Clara, CA (US)

(*) Notice: Subject to any disclaimer, the term of this patent is extended or adjusted under 35 U.S.C. 154(b) by 852 days.

(21) Appl. No.: 17/553,842

(22) Filed: Dec. 17, 2021

(65) Prior Publication Data
US 2022/0107203 A1  Apr. 7, 2022

(51) Int. Cl.
| | |
|---|---|
| *G05D 1/00* | (2024.01) |
| *B60W 30/06* | (2006.01) |
| *B60W 60/00* | (2020.01) |
| *G01C 21/34* | (2006.01) |
| *G01C 21/36* | (2006.01) |
| *G06V 20/58* | (2022.01) |

(Continued)

(52) U.S. Cl.
CPC ......... *G01C 21/3691* (2013.01); *B60W 30/06* (2013.01); *B60W 60/001* (2020.02); *G01C 21/3415* (2013.01); *G06V 20/586* (2022.01); *G08G 1/143* (2013.01); *B60L 53/51* (2019.02); *B60W 2555/20* (2020.02); *B60W 2556/10* (2020.02)

(58) Field of Classification Search
CPC ................................................. G01C 21/3691
See application file for complete search history.

(56) References Cited

U.S. PATENT DOCUMENTS

| | | | |
|---|---|---|---|
| 2013/0120160 A1* | 5/2013 | Ren | G08G 1/144 340/932.2 |
| 2013/0204456 A1 | 8/2013 | Tippelhofer et al. | |
| 2017/0089721 A1* | 3/2017 | Akselrod | G01C 21/3407 |

(Continued)

OTHER PUBLICATIONS

Mehrija Hasicic et al.; "Criteria for Solar Car Optimized Route Estimation"; May 2017; 19 pages; https://arxiv.org/ftp/arxiv/papers/1705/1705.03254.pdf; retrieved on Dec. 14, 2021.

(Continued)

*Primary Examiner* — Vivek D Koppikar
*Assistant Examiner* — Paul W Arellano
(74) *Attorney, Agent, or Firm* — Viering, Jentschura & Partner mbB

(57) ABSTRACT

A vehicle navigation device may include a processor. The processor may receive an illumination map that includes route segments corresponding to an area. The illumination map may include a probability of solar radiation value for each of the route segments. The processor may receive a request to generate a navigation route from a start point to an end point within the area. The processor may determine navigable routes from the start point to the end point using the route segments. The processor may determine an overall probability of solar radiation value for each of the navigable routes based on the probability of solar radiation value for each route segment. The processor may identify a navigable route considering the overall probability of solar radiation values as an illumination route. The processor may generate an instruction to a display device to display the illumination route as a navigable route for the vehicle.

14 Claims, 7 Drawing Sheets

(51) Int. Cl.
*G08G 1/14* (2006.01)
*B60L 53/51* (2019.01)

(56) References Cited

U.S. PATENT DOCUMENTS

| | | | | |
|---|---|---|---|---|
| 2019/0277643 | A1* | 9/2019 | Szubbocsev | B60W 60/0016 |
| 2019/0310101 | A1* | 10/2019 | Nagata | G01C 21/3617 |
| 2020/0111359 | A1* | 4/2020 | Yim | G08G 1/09623 |
| 2021/0095968 | A1* | 4/2021 | Karon | G01S 5/0252 |
| 2021/0262823 | A1* | 8/2021 | Abdelaziz | G01C 21/3685 |
| 2021/0333112 | A1* | 10/2021 | Matsunaga | G01C 21/3605 |
| 2021/0383269 | A1* | 12/2021 | Zhou | G05D 1/0231 |

OTHER PUBLICATIONS

Wikipedia; "Stella (solar vehicles)"; https://en.wikipedia.org/wiki/Stella_(solar_vehicles); retrieved on Dec. 14, 2021; 7 pages.
Solar Team Eindhoven; "Stella Family—Solar Team Eindhoven"; https://solarteameindhoven.nl/stella-family#:~:text=Stella%20Era%20is%20a%20comfortable,a%20charging%20station%20on%20wheels.&text=Stella%20Era%20unlocks%20the%20potential,as%20power%20plants%20on%20wheels; retrieved on Feb. 7, 2022; 3 pages.
Ekaitz Ortega et al.; "Toyota is working on innovating a solar-powered electric car that can 'run forever' and never needs charging"; Business Insider España; https://www.businessinsider.com/toyota-solar-powered-e-car-never-needs-charging-2019-9?IR=T; retrieved on Dec. 14, 2021; 8 pages.
Mobileye; "Road Experience Management"; https://www.mobileye.com/our-technology/rem/; retrieved on Dec. 14, 2021; 22 pages.
Taoufik Sahdane; "Influence of light intensity on open circuit voltage ($V_{Oc}$) of PEDOT: PSS / C60 solar cells"; https://www.researchgate.net/figure/Influence-of-light-intensity-on-open-circuitvoltage-V-OC-of-PEDOT-PSS-C60-solar_fig3_311766896; retrieved on Dec. 14, 2021; 4 pages; Researchgate.
Jiang, Landu et al. "SunChase: Energy-Efficient Route Planning for Solar-Powered EVs", IEEE computer society, Jun. 5, 2017, p.p. 383-393, DOI 10.1109/ICDCS.2017.214.
The extended European search report for the corresponding European patent application No. 22200041.6, dated May 9, 2023, 12 pages (For informational purposes only).

* cited by examiner

NAVIGATION ROUTES FOR VEHICLES

FIELD

The aspects discussed in the present disclosure are related to navigation routes for vehicles.

BACKGROUND

Unless otherwise indicated in the present disclosure, the materials described in the present disclosure are not prior art to the claims in the present application and are not admitted to be prior art by inclusion in this section.

A vehicle may include a solar panel that includes an array of photovoltaic (PV) cells. The PV cells may generate energy based on solar radiation received by the solar panel. The vehicle may use the energy to power an engine for locomotion of the vehicle, to power one or more components within the vehicle, or some combination thereof.

The subject matter claimed in the present disclosure is not limited to aspects that solve any disadvantages or that operate only in environments such as those described above. Rather, this background is only provided to illustrate one example technology area where some aspects described in the present disclosure may be practiced.

BRIEF DESCRIPTION OF THE DRAWINGS

Example aspects will be described and explained with additional specificity and detail through the use of the accompanying drawings in which.

DETAILED DESCRIPTION

Figure 1:
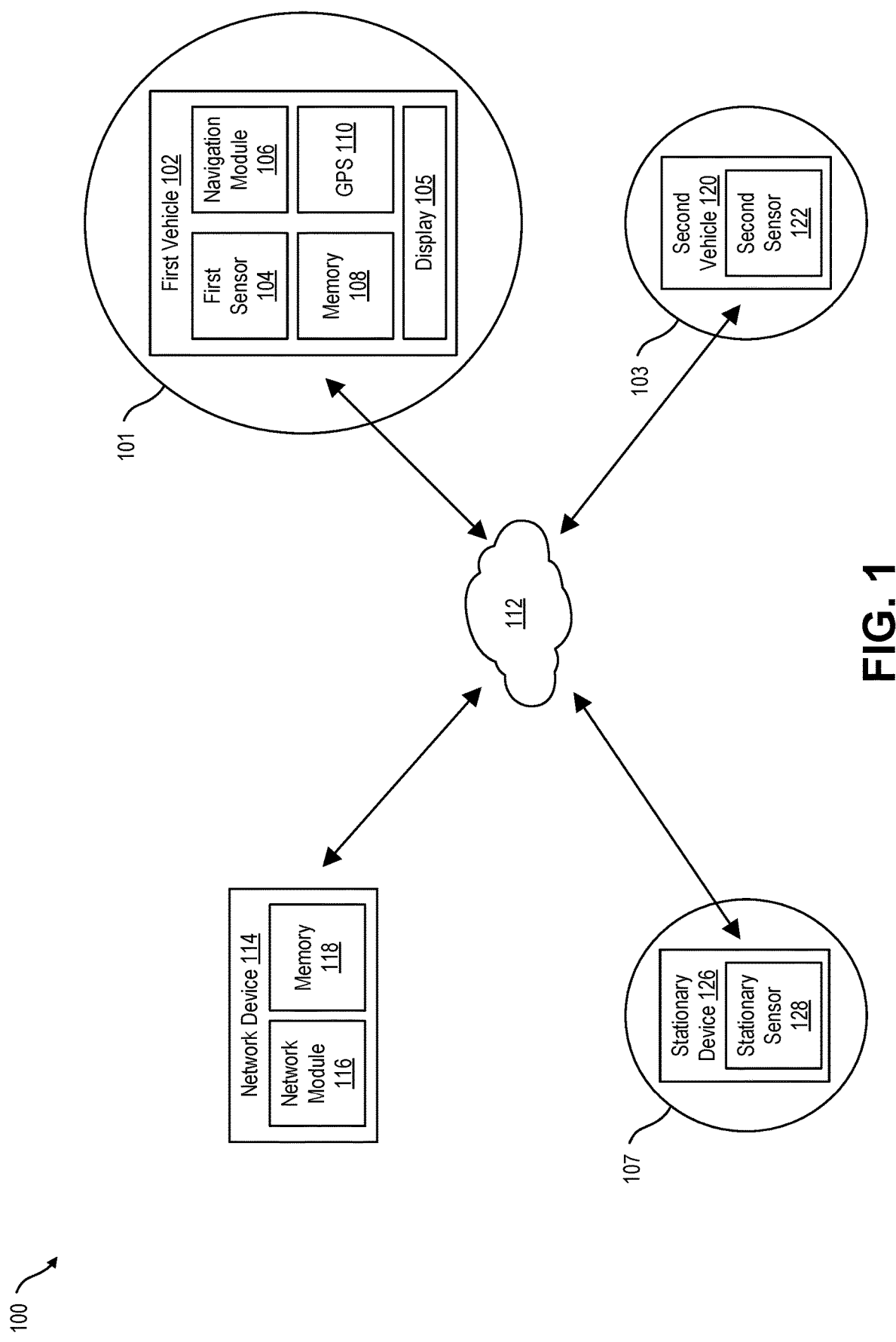
FIG. 1 illustrates a block diagram of an exemplary operational environment for a vehicle to determine the navigation route that corresponds to the highest overall probability of solar radiation value.

A vehicle may include a solar panel that includes an array of PV cells. The solar panel (e.g., the PV cells) may generate energy based on solar radiation received by the solar panel. The vehicle may use the energy to power an engine for locomotion of the vehicle, to power one or more components within the vehicle, or some combination thereof.

The solar panel may generate the energy only when exposed to the solar radiation (e.g., only when the solar panel is receiving the solar radiation). A rate at which the solar panel generates the energy may be based on an exposure level of the solar panel (e.g., a level of the solar radiation that the solar panel is receiving). For example, if the vehicle is partially or completely shielded from the solar radiation, the rate at which the solar panel generates the energy may be reduced compared to if the vehicle is directly exposed to the solar radiation.

When the vehicle traverses a route, the solar panel may be exposed to the solar radiation. Some solar powered vehicle technologies, may determine a solar radiation value of the route (e.g., each route segment of the route) based on an actual energy output of the PV cells. These solar powered vehicle technologies may determine a solar radiation value of the route based on an actual amount of solar radiation that the solar panel is exposed to and is then converted to the energy. These solar powered vehicle technologies may not consider solar radiation that is proximate but not received by the solar panel when traversing the route to determine the solar radiation value of the route to for generating a navigation route for the vehicle.

One or more of the aspects described in the present disclosure may use sensor data representative of a scene that is physically larger than the vehicle to determine the solar radiation value of the route for generating the navigation route for the vehicle. In addition, one or more aspects described in the present disclosure may use an illumination map to identify a navigable route as an illumination route (e.g., a navigable route that corresponds to a highest overall probability of a solar radiation value) for generating the navigation route of the vehicle.

The vehicle may include a navigation module and a sensor. The sensor may include an outward facing camera. The sensor may capture sensor data representative of the scene proximate the vehicle. The navigation module may estimate the solar radiation (e.g., an intensity of the solar radiation) proximate the vehicle within the scene based on the sensor data. The sensor data may also indicate a date, a time, a physical location of the vehicle, or some combination thereof corresponding to the sensor data. A network device may generate the illumination map based on the sensor data captured by the vehicle and based on sensor data captured by other sources. The vehicle may identify the illumination route to increase a probability of the vehicle being exposed to solar radiation compared to other navigable routes.

A vehicle navigation device may include a processor that includes the navigation module. The navigation module may receive the illumination map from the network device. The illumination map may include route segments corresponding to a navigation area. The illumination map may also include a probability of solar radiation value for each of the route segments. The navigation module may receive a request to generate the navigation route for the vehicle. The request may indicate a start point and an end point within the navigation area for the navigation route.

The navigation module may determine multiple navigable routes from the start point to the end point using the route segments in the illumination map. The navigation module may also determine an overall probability of solar radiation value for each of the navigable routes. The navigation module may determine the overall probability of solar radiation value for each of the navigable routes based on the probability of solar radiation value for each route segment associated with a corresponding navigable route.

The navigation module may identify a navigable route as the illumination route, which may correspond to the navigable route that includes a greatest overall probability of solar radiation value. The navigation module may also generate an instruction to a display within the vehicle to display the illumination route as the navigation route for the vehicle.

A device may include a processor that includes a network module. The network module may receive first sensor data representative of a first scene proximate a first vehicle. The network module may also receive second sensor data representative of a second scene. In addition, the network module may generate the illumination map based on the first sensor data, the second sensor data, or some combination thereof. The network module may generate the illumination map to include the route segments corresponding to the navigation area.

The network module may receive the request to generate the navigation route for the vehicle. The network module may also determine the navigable routes from the start point to the end point using the route segments in the illumination map. In addition, the network module may determine the overall probability of solar radiation value for each of the navigable routes. Further, the network module may identify the navigable route as the illumination route. The network module may generate the instruction to the display within the vehicle to display the illumination route as the navigation route for the vehicle.

One or more aspects of the present disclosure may consider solar radiation that is proximate but not actually received by the solar panel to determine the solar radiation value of the route. In addition, one or more aspects of the present disclosure may determine the navigation route based on a higher probability of exposure to the solar radiation. The illumination map may be generated based on the sensor data representative of the scene within a field of view of the sensor. In addition, the illumination map may be based on sensor data from other sources such as another vehicle, a stationary sensor, or some combination thereof.

These and other aspects of the present disclosure will be explained with reference to the accompanying figures. It is to be understood that the figures are diagrammatic and schematic representations of such example aspects, and are not limiting, nor are they necessarily drawn to scale. In the figures, features with like numbers indicate like structure and function unless described otherwise.

FIG. 1 illustrates a block diagram of an exemplary operational environment 100 for a vehicle to determine the navigation route that corresponds to the highest overall probability of solar radiation value, in accordance with at least one aspect described in the present disclosure.

The operational environment 100 may include a first vehicle 102, a second vehicle 120, a stationary device 126, and a network device 114. The first vehicle 102, the second vehicle 120, and the stationary device 126 may each be communicatively coupled to the network device 114 via a network 112 (e.g., the Internet).

The first vehicle 102 may include a solar powered vehicle, an autonomous vehicle, or any other appropriate type of vehicle. In addition, the first vehicle 102 may include a first sensor 104, a navigation module 106, a memory 108, a GPS 110, and a display 105. The first sensor 104 may include a camera and may capture first sensor data representative of a first scene 101 proximate the first vehicle 102. The first scene 101 may correspond to a physical area that is physically larger than the first vehicle 102.

The navigation module 106 may include code and routines configured to enable the first vehicle 102 to perform one or more operations with respect to determining the navigation route that corresponds to the highest overall probability of solar radiation value. Additionally or alternatively, the navigation module 106 may be implemented using hardware including a processor, a microprocessor (e.g., to perform or control performance of one or more operations), a field programmable gate array (FPGA), an application-specific integrated circuit (ASIC), or any other appropriate device. The navigation module 106 may be implemented using a combination of hardware and software.

The memory 108 may store data being processed by the navigation module 106, the first vehicle 102, the GPS 110, or some combination thereof. In addition, the memory 108 may store the illumination map, the first sensor data, or other data to permit the navigation module 106 or the first vehicle 102 to perform the operations described in the present disclosure.

The second vehicle 120 may include a second sensor 122. The second sensor 122 may include a camera and may capture second sensor data representative of a second scene 103 proximate the second vehicle 120. The second scene 103 may correspond to a physical area that is physically larger than the second vehicle 120.

The stationary device 126 may include a stationary sensor 128. The stationary sensor 129 may include a camera and may capture third sensor data representative of a third scene 107 proximate the stationary device 126. The third scene 107 may correspond to a physical area that is physically larger than the stationary device 126. The stationary device 126 may include a surveillance system, a closed-circuit television system, or some combination thereof.

Portions of or all of the physical areas corresponding to the first scene 101, the second scene 103, the third scene 107, or some combination thereof may overlap. In addition, the first scene 101, the second scene 103, the third scene 107, or some combination thereof may correspond to one or more route segments of the navigation route for the first vehicle 102.

The network device 114 may include a network module 116 and a memory 118. The network module 116 may include code and routines configured to enable the network device 114 to perform one or more operations with respect to generating the illumination map, determining the navigation route that corresponds to the highest overall probability of solar radiation value, or some combination thereof. Additionally or alternatively, the network module 116 may be implemented using hardware including a processor, a microprocessor (e.g., to perform or control performance of one or more operations), an FPGA, an ASIC, or any other appropriate device. The network module 116 may be implemented using a combination of hardware and software.

The memory 118 may store data being processed by the network module 116, the network device 114, or some combination thereof. In addition, the memory 118 may store the illumination map, the first sensor data, the second sensor data, the third sensor data, or other data to permit the network module 116 or the network device to perform the operations described in the present disclosure.

The navigation module 106 may receive the first sensor data from the first sensor 104, the GPS 110, or some combination thereof. The first sensor data may be representative of the first scene 101. The first sensor data may include information indicating a road marker, a lamp post, an identified object, an obstacle, ambient light, environment illumination, or some combination thereof within the first scene 101. In addition, the first sensor data may include an estimated illumination value for each route segment corresponding to the first scene 101. Further, the first sensor data may include a time data, a physical location data, or some combination thereof corresponding to capture of the first sensor data by the first sensor 104. The navigation module 106 may provide the first sensor data to the network device 114 via the network 112.

The second vehicle 120 may receive the second sensor data from the second sensor 122. The second sensor data may be representative of the second scene 103. The second sensor data may include information indicating a road marker, a lamp post, an identified object, an obstacle, ambient light, environment illumination, or some combination thereof within the second scene 103. In addition, the second sensor data may include an estimated illumination value for each route segment corresponding to the second scene 103. Further, the second sensor data may include a time data, a physical location data, or some combination thereof corresponding to capture of the second sensor data by the second sensor 122. The second vehicle 120 may provide the second sensor data to the network device 114 via the network 112.

The stationary device 126 may receive the third sensor data from the stationary sensor 128. The third sensor data may be representative of the third scene 107. The third sensor data may include information indicating a road marker, a lamp post, an identified object, an obstacle, ambient light, environment illumination, or some combination thereof within the third scene 107. In addition, the third sensor data may include an estimated illumination value for each route segment corresponding to the third scene 107. Further, the third sensor data may include a time data, a physical location data, or some combination thereof corresponding to capture of the third sensor data by the stationary sensor 128. The stationary device 126 may provide the third sensor data to the network device 114 via the network 112.

The network module 116 may receive the first sensor data, the second sensor data, the third sensor data, or some combination thereof. The network module 116 may access the first sensor data, the second sensor data, and the third sensor data in the memory 118. The network module 116 may generate the illumination map based on the first sensor data, the second sensor data, the third sensor data, or some combination thereof. The illumination map may include route segments. The route segments may correspond to the navigation area.

The network module 116 may average the estimated value for each route segment within the navigation area over the first sensor data, the second sensor data, the third sensor data, or some combination thereof. The navigation area may include at least a portion of the physical areas corresponding to the first scene 101, the second scene 103, the third scene 107, or some combination thereof.

The illumination map may include a probability of solar radiation value for each of the route segments. The network module 116 may determine the probability of solar radiation value for each of the route segments based on the first sensor data, the second sensor data, or some combination thereof. The network module 116 may determine the probability of solar radiation value for each of the route segments by averaging the estimated value for each route segment over a period of time. In addition, the network module 116 may determine the probability of solar radiation value for of the route segments using a machine learning algorithm or an artificial intelligence algorithm. The machine learning algorithm may include a recurrent neural network, a linear regression algorithm, a logistic regression algorithm, a decision tree algorithm, a deep learning algorithm, a supervised algorithm an unsupervised learning algorithm a reinforcement algorithm, or any other appropriate ML algorithm.

The network module 116 may also receive updated first data sensor, updated sensor data, updated third sensor data, or some combination thereof. The network module 116 may update the illumination map based on the updated first data sensor, the updated sensor data, the updated third sensor data, or some combination thereof.

An example in which the navigation module 106 determines the navigation route that corresponds to the highest overall probability of solar radiation value is now discussed. The navigation module 106 may receive the illumination map from the network module 116 via the network 112. The navigation module 106 may also receive a request to generate a navigation route for the first vehicle 102. The navigation request may indicate a start point and an end point for the navigation route within the navigation area. The navigation module 106 may determine multiple navigable routes from the start point to the end point using the route segments within the illumination map, the GPS 110, or some combination thereof.

The navigation module 106 may determine the overall probability of solar radiation value for each of the navigable routes based on the probability of solar radiation value for each route segment associated with a corresponding navigable route. The navigation module 106 may determine the overall probability of the solar radiation value for each of the navigable routes by identifying the probability of solar radiation value for each route segment associated with the corresponding navigable route using the illumination map. In addition, the navigation module 106 may sum the probability of solar radiation values for each route segment associated with the corresponding navigable route. The overall probability of solar radiation value for the corresponding navigable route may include a summed probability of solar radiation value for each route segment associated with the corresponding navigable route.

The navigation module 106 may determine an estimated time for the first vehicle 102 to traverse each navigable route. The overall probability of solar radiation value for each of the navigable routes may be further based on the amount of time to traverse the corresponding navigable route. Further, the navigation module 106 may receive input data. The overall probability of solar radiation value for each of the navigable routes may be further based on the input data.

The navigation module 106 may identify a navigable route considering the overall probability of solar radiation values as an illumination route. For example, the navigation module 106 may identify the navigable route that corresponds to a greatest overall probability of solar radiation value as the illumination route. The navigation module 106 may generate an instruction to the display 105 to display the illumination route as the navigation route for the first vehicle 102. If the first vehicle 102 includes an autonomous vehicle, the navigation module 106 may cause the first vehicle 102 to traverse the illumination route as the navigation route.

An example in which the network module 116 determines the navigation route that corresponds to the highest overall probability of solar radiation value is now discussed. The network module 116 may receive the request to generate the navigation route for the first vehicle 102. The network module 116 may determine multiple navigable routes from the start point to the end point for the navigation route using the route segments within the illumination map.

The network module 116 may determine the overall probability of solar radiation value for each of the navigable routes based on the probability of solar radiation value for each route segment associated with a corresponding navigable route. The network module 116 may determine the overall probability of the solar radiation value for each of the navigable routes by identifying the probability of solar radiation value for each route segment associated with the corresponding navigable route using the illumination map. In addition, the network module 116 may sum the probability of solar radiation values for each route segment associated with the corresponding navigable route.

The network module 116 may determine the estimated time for the first vehicle 102 to traverse each of the navigable routes. The overall probability of solar radiation value for each of the navigable routes may be further based on the amount of time to traverse the corresponding navigable route. Further, the network module 116 may receive the input data. The overall probability of solar radiation value for each of the navigable routes may be further based on the input data.

The network module 116 may identify the navigable route corresponding to the greatest overall probability of solar radiation values as the illumination route. The network module 116 may generate the instruction to the display 105 to display the illumination route as the navigation route for the first vehicle 102. If the first vehicle 102 includes an autonomous vehicle, the network module 116 may cause the first vehicle 102 to traverse the illumination route.

An example in which the navigation module 106 determines a parking spot that corresponds to the highest overall probability of solar radiation value is now discussed. The navigation module 106 may receive a request to identify a parking spot that corresponds to the greatest overall probability of solar radiation value. The parking spot may be positioned within a parking lot within the first scene 101. The navigation module 106 may receive the first sensor data. The first sensor data may be representative of the first scene 101 including the parking lot.

The navigation module 106 may identify actual parking spots within the parking lot. The navigation module 106 may identify the actual parking spots using a pre-defined parking layout of the parking lot stored in the memory 108 or received via the network 112. The navigation module 106 may also identify unoccupied parking spots within the parking lot using the pre-defined parking layout and the first sensor data. In addition, the navigation module 106 may identify illumination areas within the first scene 101 that correspond to unoccupied parking spots within the parking lot based on the first sensor data. Further, the navigation module 106 may determine an overall parking probability of solar radiation value for each unoccupied parking spot. The parking probability of solar radiation values may be based on the identified illumination areas and the probability of solar radiation value for a corresponding route segment associated with the parking lot in the illumination map.

The navigation module 106 may identify an unoccupied parking spot that corresponds to the greatest overall parking probability of solar radiation value as an illumination parking spot. The navigation module 106 may cause the display 105 to display the illumination parking spot as the parking spot that corresponds to the greatest overall probability of solar radiation value for the first vehicle 102. If the first vehicle 102 includes an autonomous vehicle, the navigation module 106 may also cause the first vehicle 102 to traverse the illumination route.

Figure 2:
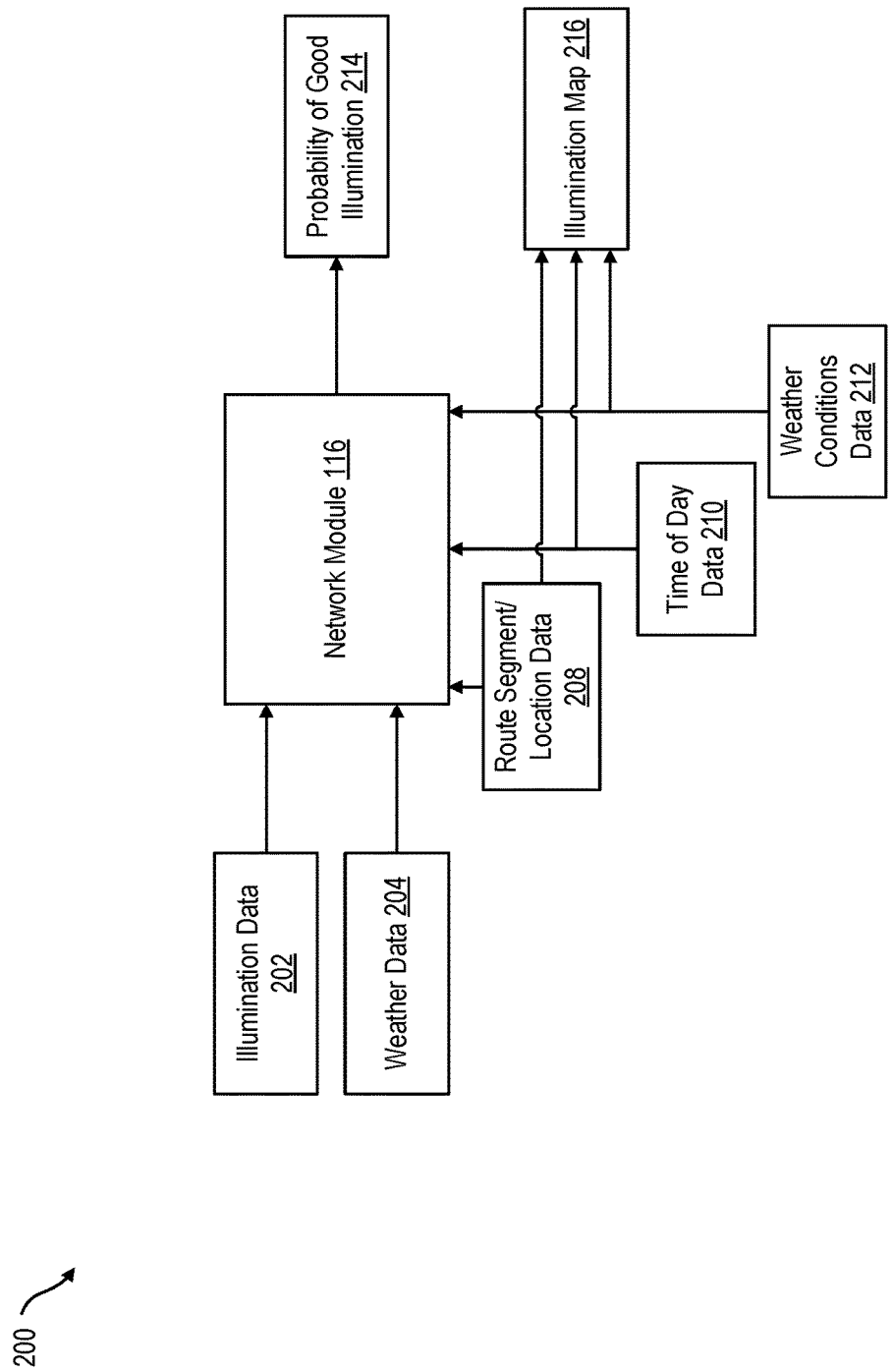
FIG. 2 illustrates a flowchart of an exemplary operational environment of the network module of FIG. 1.

FIG. 2 illustrates a flowchart of an exemplary operational environment 200 of the network module 116 of FIG. 1, in accordance with at least one aspect described in the present disclosure. The network module 116 may receive illumination data 202, weather data 204, route segment/location data 208, time of day data 210, and weather conditions data 212. The illumination data 202, the weather data 204, the route segment/location data 208, the time of day data 210, and the weather conditions data 212 may correspond to the sensor data (e.g., the first sensor data, the second sensor data, the third sensor data, or some combination thereof). The illumination data 202 may include an averaged illumination data.

The network module 116 may determine a probability of good illumination 214. The probability of good illumination 214 may be based on the illumination data 202, the weather data 204, the route segment/location data 208, the time of day data 210, the weather conditions data 212, or some combination thereof. The network module 116 may determine the probability of good illumination 214 for each of the route segments within the navigation area. The network module 116 may combine the probability of good illumination 214 for each of the route segments to generate the illumination map 216. In addition, the network module 116 may add the route segment/location data 208, the time of day data 210, the weather conditions data 212, or some combination thereof to the illumination map 216.

Figure 3:
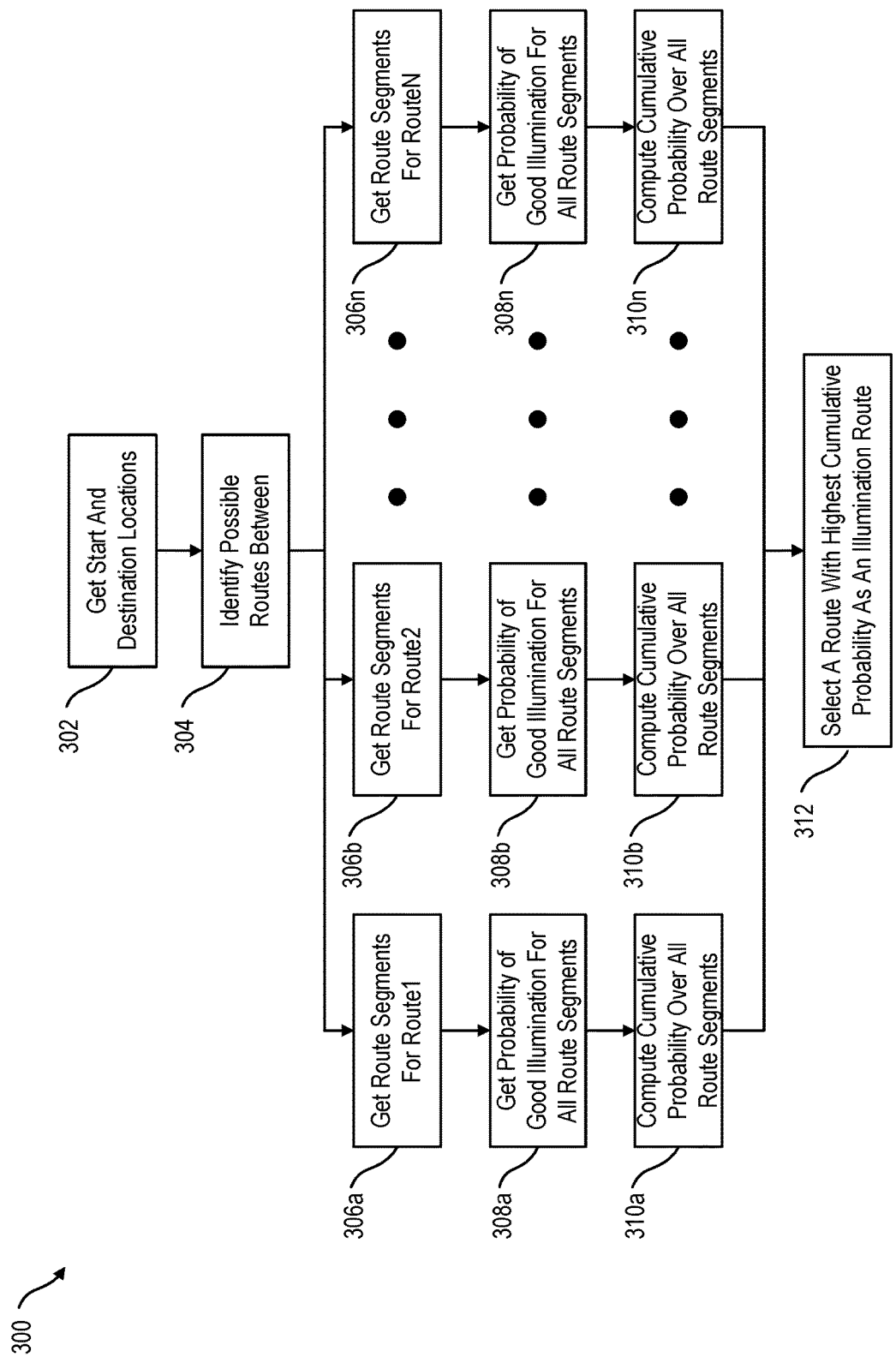
FIG. 3 illustrates a flowchart of an exemplary method to determine the navigation route that corresponds to the highest overall probability of solar radiation value.

FIG. 3 illustrates a flowchart of an exemplary method 300 to determine the navigation route that corresponds to the highest overall probability of solar radiation value, in accordance with at least one aspect described in the present disclosure. The method 300 may be performed by any suitable system, apparatus, or device with respect to determining the navigation route that corresponds to the highest overall probability of solar radiation value. For example, the navigation module 106, the network module 116, or some combination thereof of FIG. 1 may perform or direct performance of one or more of the operations associated with the method 300. The method 300 is described in relation to FIG. 3 as being performed by the navigation module 106 for example purposes. The method 300 may include one or more blocks 302, 304, 306*a-n*, 308*a-n*, 310*a-n*, or 312. Although illustrated with discrete blocks, the operations associated with one or more of the blocks of the method 300 may be divided into additional blocks, combined into fewer blocks, or eliminated, depending on the particular implementation.

At block 302, the navigation module 106 may get start and destination locations. The navigation module 106 may receive the navigation request that includes the start point and the end point of the navigation route. Block 302 may be followed by Block 304.

At block 304, the navigation module 106 may identify possible routes between. The navigation module 106 may determine multiple navigable routes from the start point to the end point. Block 304 may be followed by blocks 306*a-n*. For example, for a first navigable route, block 304 may be followed by block 306*a* and for a second navigable route, block 304 may be followed by block 306*b*. As indicated by the ellipsis and the Nth block 306*n* in FIG. 3, block 304 may be followed by any appropriate number of blocks 306*a-n*.

A single example in relation to the first navigable route (e.g., block 306*a*, block 308*a*, and block 310*a*) is now discussed. The process described for the first navigable route may be repeated for each of the navigable routes using the corresponding navigable routes. At block 306*a*, the navigation module 106 may get route segments for route 1 (e.g., the first navigable route). The navigation module 106 may identify and obtain data corresponding to each route segment corresponding to the first navigable route. Block 306*a* may be followed by block 308*a*.

At block 308*a*, the navigation module 106 may get probability of good illumination for all route segments. The navigation module 106 may determine the probability of solar radiation value for each route segment associated with the first navigable route. Block 308*a* may be followed by block 310*a*.

At block 310*a*, the navigation module 106 may compute cumulative probability over all route segments. The navigation module 106 may sum the probability of solar radiation values for each route segment associated with the first navigable route. Blocks 310*a-n* may be followed by block 312.

At block 312, the navigation module 106 may select a route with highest cumulative probability as the illumination route. The navigation module 106 may identify one of the navigable routes as the illumination route. The illumination route may include the navigable route that includes the greatest overall probability of solar radiation value. In addition, the navigation module 106 may consider user selected influencing factors for identifying the illumination route. For example, the navigation module 106 may consider the time to travel, a distance for the navigable routes, a toll preference, a highway preference, or some combination thereof.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

Figure 4:
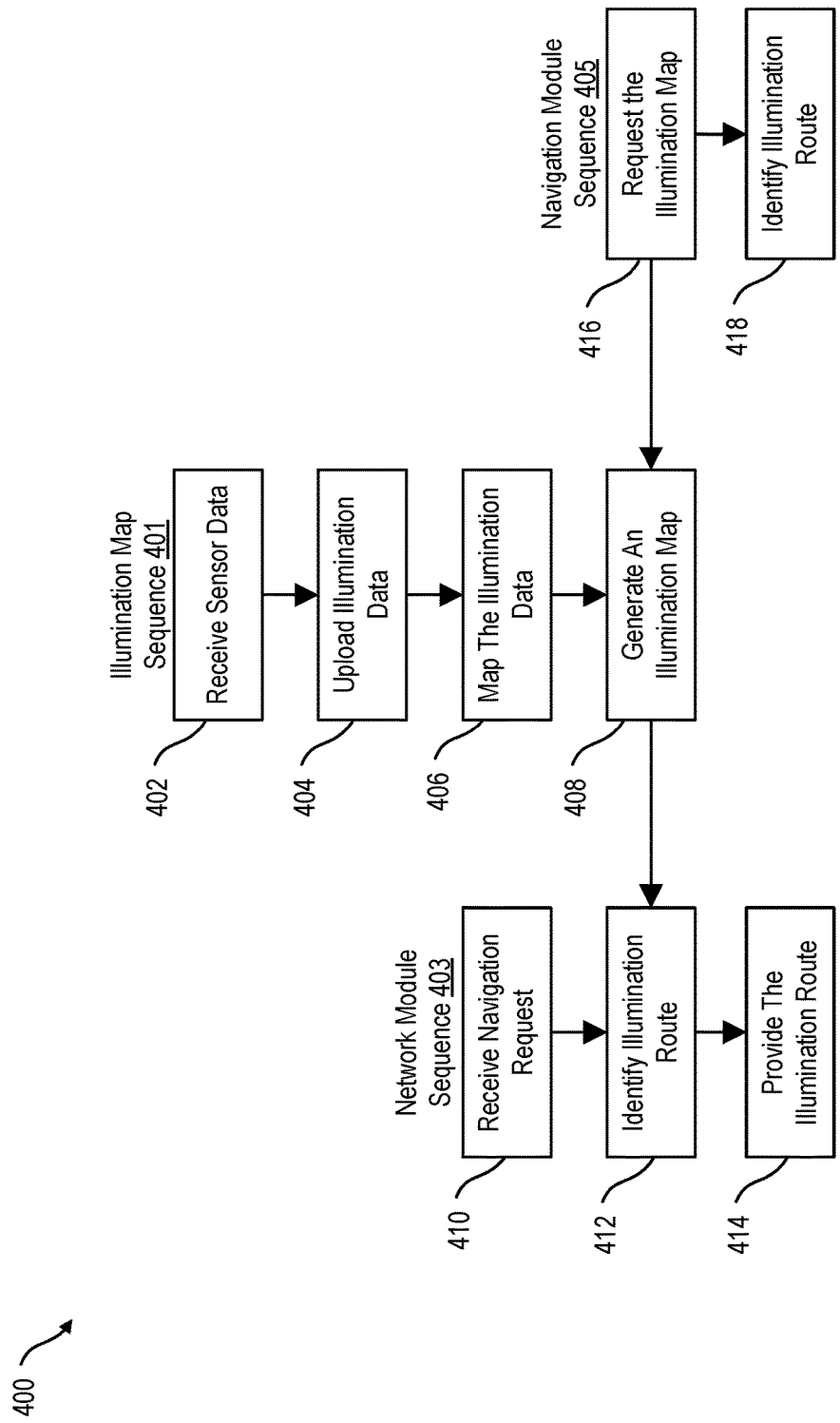
FIG. 4 illustrates an exemplary operations sequence to determine the navigation route that corresponds to the highest overall probability of solar radiation value.

FIG. 4 illustrates an exemplary operations sequence 400 to determine the navigation route that corresponds to the highest overall probability of solar radiation value, in accordance with at least one aspect described in the present disclosure. The exemplary operations sequence 400 may include an illumination map sequence 401, a network module sequence 403, a navigation module sequence 405, or some combination thereof.

The illumination map sequence 401 may include blocks 402, 404, 406, or 408. At block 402, the network module 116 may receive the sensor data. The sensor data may include estimations by the sensors in the vehicles including environment illumination per route segment over time. Block 402 may be followed by block 404. At block 404, the network module 116 may upload illumination data. The network module 116 may upload the illumination data for high definition map creation per route segment over time. Block 404 may be followed by block 406.

At block 406, the network module 116 may map the illumination data. The network module 116 may map the illumination data using pre-defined rules, a machine learning algorithm, an artificial intelligence algorithm, or some combination thereof. Block 406 may be followed by block 408. At block 408, the network module 116 may generate the illumination map. The network module 116 may generate the illumination map to include illumination probability values for each route segment within the navigation area. The illumination probability values may improve solar charging of the vehicle for the route segments over time and over different conditions. Block 408 may be followed by the network module sequence 403 or the navigation module sequence 405.

The network module sequence 403 may include blocks 410, 412, and 414. At block 410, the network module 116 may receive a navigation request from the navigation module 106. The navigation request may include a request for the navigation route from the start point to the end point that includes the highest overall probability of solar radiation value. Block 410 may be followed by block 412. At block 412, the network module 116 may identify the illumination route. The network module 116 may identify one or more navigable routes from the start point to the end point. The network module 116 may use the illumination map to identify one of the navigable routes that corresponds to the greatest overall probability of solar radiation value as the illumination route. Block 412 may be followed by block 414. At block 414, the network module 116 may provide the illumination route to the navigation module 106. The network module 116 may provide the illumination route as the navigation route for the vehicle.

The navigation module sequence 405 may include blocks 416 and 418. At block 416, the navigation module 106 may request the illumination map from the network module 116. Block 416 may be followed by block 418. At block 418, the navigation module 106 may identify the illumination route. The navigation module 106 may identify one or more navigable routes from the start point to the end point. The navigation module 106 may use the illumination map to identify one of the navigable routes that corresponds to the greatest overall probability of solar radiation value as the illumination route.

Figure 5:
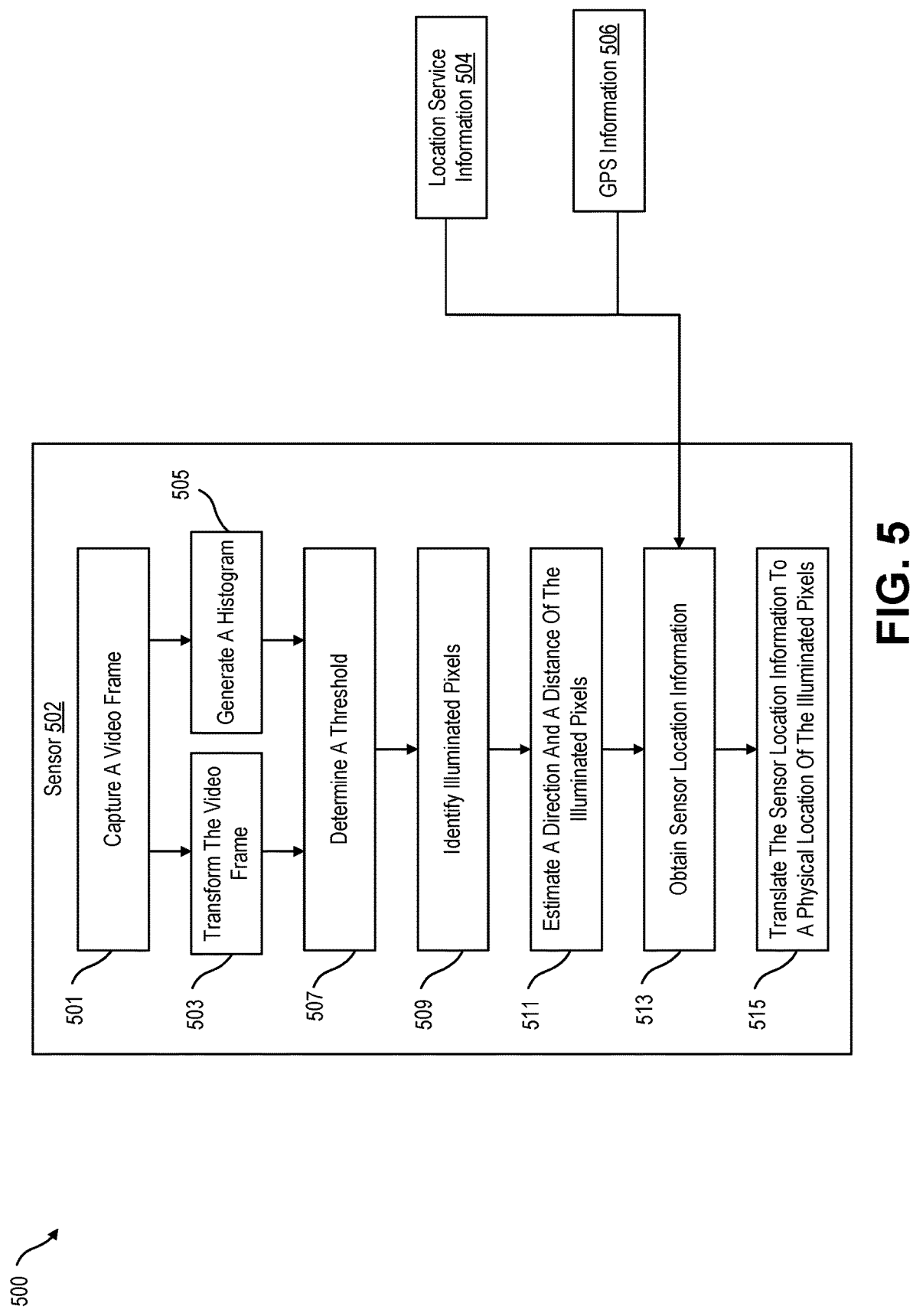
FIG. 5 illustrates an exemplary operations sequence for a sensor to determine points of illumination within a scene.

FIG. 5 illustrates an exemplary operations sequence 500 for a sensor 502 to determine points of illumination within a scene, in accordance with at least one aspect described in the present disclosure. The sensor 502 may correspond to the first sensor 104, the second sensor 122, or the stationary sensor 128 of FIG. 1. The operations sequence 500 may include blocks 501, 503, 505, 507, 509, 511, 513, and 515.

At block 501, the sensor 502 may capture a video frame. The video frame may include a video image, a still image, or some combination thereof. The video frame may be representative of the scene proximate the sensor 502. At block 503, the sensor 502 may transform the video frame to a color space. For example, the sensor 502 may transform the video frame to a luma component, a blue-difference component, and a red-difference component (YCrCb) color space. At block 505, the sensor 502 may generate a histogram based on the video frame. At block 507, the sensor 502 may determine a threshold for pixels in the video frame using the transformed video frame, the histogram, or some combination thereof. At block 509, the sensor 502 may identify illuminated pixels within the video frame using the transformed video frame, the histogram, or some combination thereof.

At block 511, the sensor 502 may estimate a direction and a distance of the illuminated pixels from the sensor 502. At block 513, the sensor 502 may obtain sensor location information. For example, the sensor 502 may receive location service information 504 from a GPS or other location service provider. As another example, if the sensor 502 is physically located within a vehicle, the sensor 502 may receive vehicle GPS information from a GPS in the vehicle. At block 516, the sensor 502 may translate the sensor location information to the physical location of the illuminated pixels in the video frame. The illuminated pixels and the physical location may indicate the points of illumination within the scene.

The vehicle (e.g., the navigation module 106) or the network module 116 may use the identified points of illumination to determine intra-route updates to the navigation route. In addition, the identified illumination points may be used to identify illumination parking spots.

Figure 6:
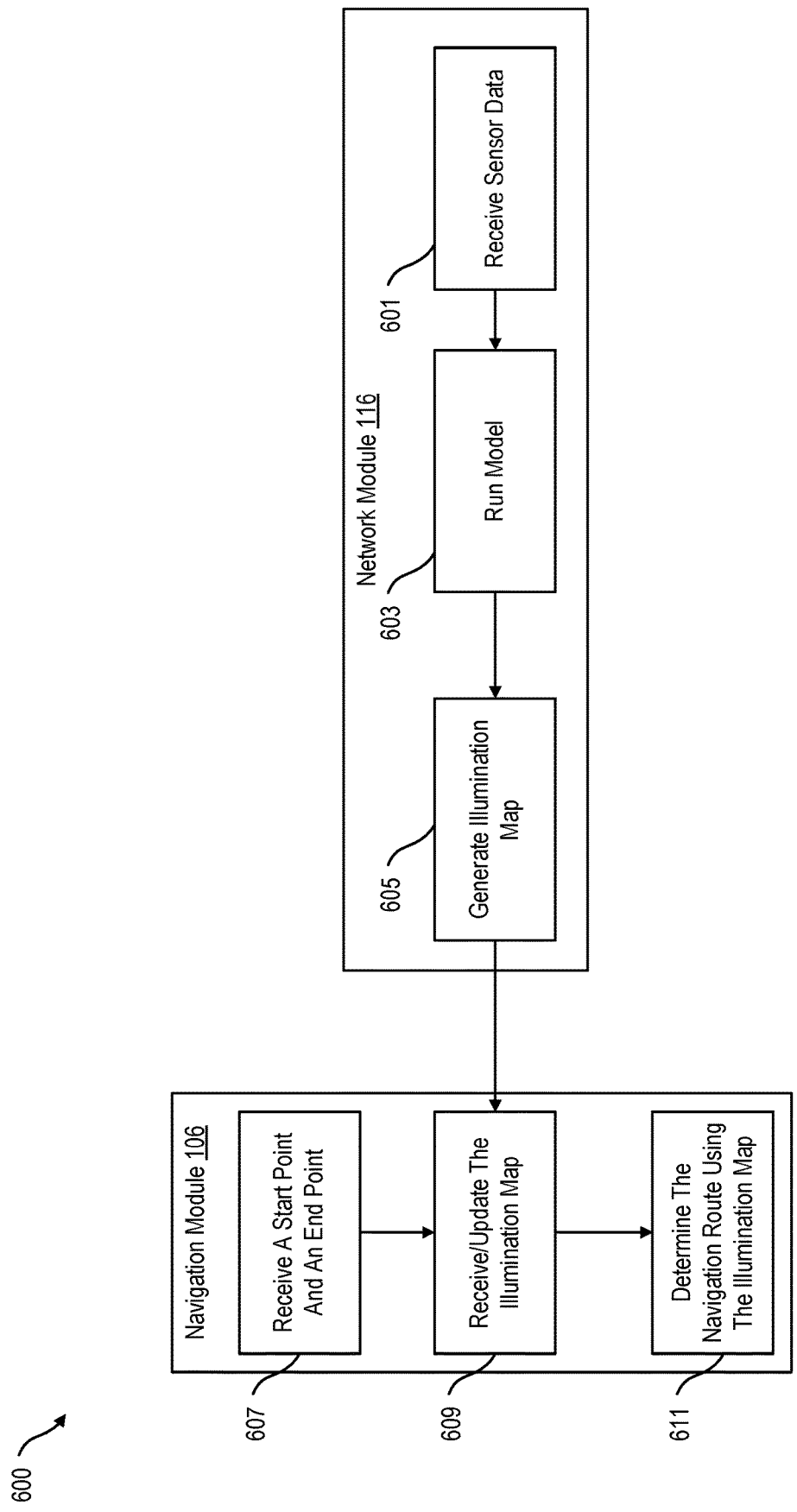
FIG. 6 illustrates an exemplary operations sequence to determine the navigation route that corresponds to the highest overall probability of solar radiation value.

FIG. 6 illustrates an exemplary operations sequence 600 to determine the navigation route that corresponds to the highest overall probability of solar radiation value, in accordance with at least one aspect described in the present disclosure. The operations sequence 600 may include blocks 601, 603, 605, 607, 609, and 611.

At block 601, the network module 116 may receive sensor data. The sensor data may include the first sensor data, the second sensor data, the third sensor data, or some combination thereof. At block 603, the network module 116 may run a model using the sensor data. The network module 116 may determine the probability of solar radiation value for each route segment within the navigation area using the model. The model may include a machine learning algorithm or an artificial intelligence algorithm. At block 605, the network module 116 may generate the illumination map. The illumination map may correspond to the navigation area and may include the route segments and the corresponding probability of solar radiation values.

At block 607, the navigation module 106 may receive the start point and the end point for the navigation route (e.g., the navigation module 106 may receive the navigation request). At block 609, the navigation module 106 may receive/update the illumination map. The navigation module 106 may receive and then update the illumination map based on current sensor data. At block 611, the navigation module 106 may determine the navigation route using the illumination map. The navigation module 106 may identify navigable routes from the start point to the end point using the illumination map. In addition, the navigation module 106 may identify the navigable route that includes the greatest overall probability of solar radiation value as the illumination route. The illumination route may correspond to the navigation route.

Figure 7:
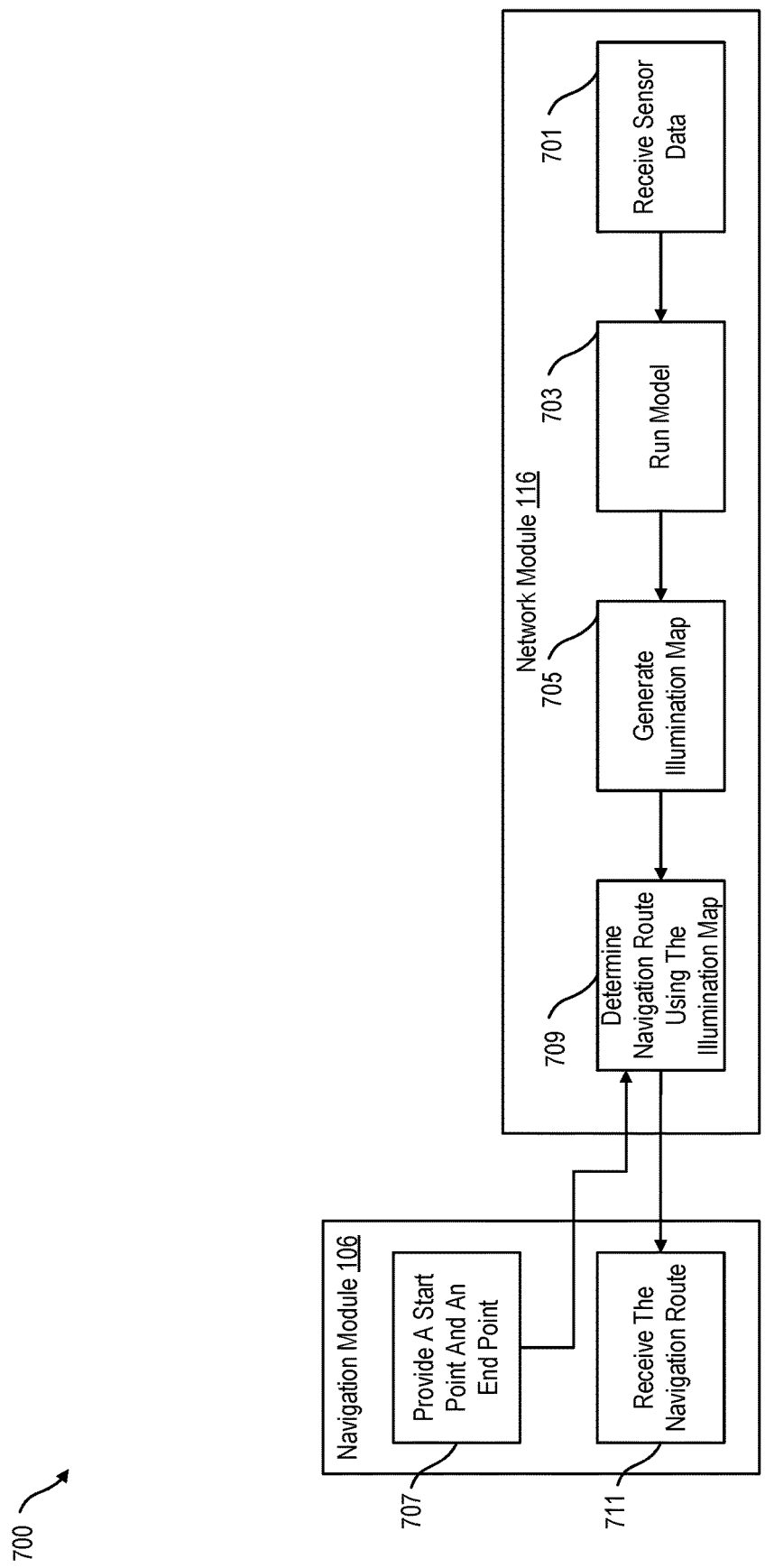
FIG. 7 illustrates another exemplary operations sequence to determine the navigation route that corresponds to the highest overall probability of solar radiation value, all according to at least one aspect described in the present disclosure.

FIG. 7 illustrates another exemplary operations sequence 700 to determine the navigation route that corresponds to the highest overall probability of solar radiation value, in accordance with at least one aspect described in the present disclosure. The operations sequence 700 may include blocks 701, 703, 705, 707, 709, and 711.

At block 701, the navigation module 116 may receive sensor data. The sensor data may include the first sensor data, the second sensor data, the third sensor data, or some combination thereof. At block 703, the network module 116 may run a model using the sensor data. The network module 116 may determine the probability of solar radiation value for each route segment within the navigation area using the model. The model may include a machine learning algorithm or an artificial intelligence algorithm. At block 705, the network module 116 may generate the illumination map. The illumination map may correspond to the navigation area and may include the route segments and the corresponding probability of solar radiation values.

At block 707, the navigation module 116 may provide the start point and the end point for the navigation route to the network module 116 (e.g., the network module 116 may receive the navigation request). At block 709, the network module 116 may determine the navigation route using the illumination map. The network module 116 may identify navigable routes from the start point to the end point. In addition, the network module 116 may identify the navigable route that includes the greatest overall probability of solar radiation value as the illumination route. The illumination route may correspond to the navigation route. At block 711, the navigation module 106 may receive the navigation route from the network module 116.

One or more of the aspects described in the present disclosure may use sensor data representative of the scene that is physically larger than the vehicle to determine the solar radiation value of the route for generating the navigation route for the vehicle. In addition, one or more aspects described in the present disclosure may use the illumination map to identify the navigable route as the illumination route (e.g., the navigable route that corresponds to the highest overall probability of the solar radiation value) for generating the navigation route of the vehicle.

The vehicle may include an outward facing camera (e.g., the sensor). The sensor may capture sensor data that may be used to build the illumination map. The illumination map may provide an optimized navigation route for charging the vehicle while traversing the navigation route. The illumination map may even be generated using sensor data from vehicles that are not solar vehicles.

The sensor may estimate an illumination/light intensity of ambient light proximate the vehicle. The sensor may cause a time, a location, and other ambient information to be stored in the cloud. The illumination data may be averaged across sensor data received from multiple vehicles. The illumination data may also be determined for different weather conditions to generate the illumination map with the probability of good illumination for solar charging at different locations and in different weather conditions. The navigation module or the network module may use the illumination map to generate navigation routes where the probability of exposure to the solar radiation along the route is the highest. The network module may use a machine learning algorithm or an artificial intelligence algorithm to generate the illumination map. The machine learning algorithm or the artificial intelligence algorithm may be trained for location and road types to predict the probability of the solar radiation based on weather and time of the day.

The navigation module may also make intra-route updates to the navigation route based on current sensor data. The intra-route updates may include a lane change, a street change, or any other appropriate update to the navigation route. The current sensor data may permit the navigation module to select a best lane for illumination. The sensor may estimate illumination of any point within the scene corresponding to the field of view of the sensor.

The navigation module, to determine the navigation route, may use standard route planning algorithms to determine traffic routes or a subset of routes. The navigation module may then apply the illumination map to determine the navigable route that includes the greatest overall probability of solar radiation.

The navigation module may estimate charging points along the navigation route for the vehicle based on a charging plan stored in a memory of the vehicle. The navigation module may select the navigation route based on user input. The navigation module may determine whether the navigation route is sufficient to charge the vehicle and reach the end point based on the user input, the illumination map, the estimated charging points, and a current battery charge. If the navigation route is not sufficient to charge the vehicle and reach the end point, the navigation module may select an alternate navigation route that is sufficient.

The vehicle navigation device may include the processor that includes the navigation module. The vehicle navigation device may also include a memory storing instructions in which, when executed by the processor, configure the processor. The navigation module may receive the illumination map. The illumination map may include multiple route segments that correspond to the navigation area.

The illumination map may include the probability of solar radiation value for each of the route segments. The probability of solar radiation value for each of the route segments may include an averaged probability of solar radiation value for a corresponding route segment.

The navigation module may receive the request to generate the navigation route. The navigation route may be for the vehicle from the start point to the end point within the navigation area. The vehicle may include an autonomous vehicle or a solar powered vehicle.

The navigation module may determine navigable routes from the start point to the end point using the route segments. The navigation module may determine the overall probability of solar radiation value for each of the navigable routes based on the probability of solar radiation value for each route segment associated with a corresponding navigable route. The navigation module may identify the probability of solar radiation value for each route segment associated with the corresponding navigable route using the illumination map. The navigation module may also sum the probability of solar radiation values for each route segment associated with the corresponding navigable route. The overall probability of solar radiation value for the corresponding navigable route may include the summed probability of solar radiation value for each route segment associated with the corresponding navigable route.

The navigation module may determine an amount of time to traverse each of the navigable routes. The navigation module may determine the overall probability of solar radiation value for each of the navigable routes further based on the amount of time to traverse the corresponding navigable route.

The navigation module may receive input data. The input data may include weather data representative of weather patterns in the area, a current season of the area, a corresponding time of day of the area, current traffic patterns of the route segments, historical traffic patterns of the route segments, or some combination thereof. The navigation module may determine the overall probability of solar radiation value for each of the navigable routes further based on the input data.

The navigation module may identify a navigable route as the illumination route considering the overall probability of solar radiation values. The navigation module may identify the navigable route that corresponds to the greatest overall probability of solar radiation values as the illumination route. The navigation module may generate the instruction to the display (e.g., the display device) to display the illumination route as the navigable route for the vehicle.

The navigation module determining the navigation route may reduce latency compared to the network module determining the navigation route.

If the vehicle includes an autonomous vehicle, the navigation module may cause the autonomous vehicle to traverse the illumination route.

While traversing the navigation route, the navigation module may determine intra-route updates. For example, a street along the navigation route may include trees, buildings, or other obstacles that shield one of two lanes from the solar radiation. The intra-route updates may identify lane changes along the street to expose the vehicle to the solar radiation.

The illumination route may include a complete (e.g., a full) route. The navigation module may receive sensor data representative of the scene proximate the vehicle from the sensor within the vehicle.

The navigation module may determine illumination values of multiple route segments within the scene. The navigation module may determine the intra-route update for the illumination route based on the illumination values. The navigation module may identify an illumination area within the scene based on the sensor data. The navigation module may also determine a current location of the vehicle within the corresponding route segment. In addition, the navigation module may determine an estimated illumination value for the illumination area. Further, the navigation module may compare the estimated illumination value to the probability of solar radiation value for the corresponding route segment. The navigation module, responsive to the illumination value being greater than the probability of solar radiation value for the corresponding route segment, may determine the intra-route update for the illumination route based on the illumination value.

The navigation module may generate an instruction to the display device to display the intra-route update to the illumination route, wherein the intra-route update corresponds to a lane change within a corresponding route segment. If the vehicle includes an autonomous vehicle, the navigation module may cause the vehicle to traverse the intra-route update.

The navigation module may receive sensor data representative of the scene proximate the vehicle from the sensor within the vehicle. The navigation module may provide the sensor data to the network module (e.g., an external device). The network module may update the illumination map based on the sensor data and external sensor data from a different vehicle or another device.

The navigation module may estimate a parking spot where the illumination is higher than other parking spots. The navigation module may identify the parking spot using a parking layout, a map, or any other appropriate information.

The navigation module may receive a request to identify a parking spot within a parking lot that corresponds to the greatest overall probability of solar radiation value for the vehicle. The navigation module may also receive sensor data (e.g., current sensor data) representative of the scene that includes the parking lot. In addition, the navigation module may identify actual parking spots within the parking lot using a pre-defined parking layout of the parking lot. Further, the navigation module may identify unoccupied parking spots within the parking lot using the pre-defined parking layout and the sensor data.

The navigation module may identify illumination areas within the scene that correspond to unoccupied parking spots within the parking lot based on the sensor data. The navigation module may also determine an overall parking probability of solar radiation value for each unoccupied parking spot based on the identified illumination areas and the probability of solar radiation value for a corresponding route segment associated with the parking lot. In addition, the navigation module may identify an unoccupied parking spot that corresponds to the greatest overall parking probability of solar radiation value as an illumination parking spot. Further, the navigation module may cause the display to display the illumination parking spot as the parking spot that corresponds to the greatest overall parking probability of solar radiation value. If the vehicle includes an autonomous vehicle, the navigation module may cause the vehicle to move to the illumination parking spot.

A device may include a processor that includes the network module. The device may also include a memory storing instructions in which, when executed by the processor, configure the processor. The network module may receive first sensor data representative of the first scene proximate the first vehicle. The first sensor data may include the estimated illumination value for each route segment corresponding to the first scene. The first sensor data may also include a time, a location, ambient solar radiation, or some combination thereof corresponding to the first scene. The first sensor data may also include a road marker, a lamp post, an identified object, or any other appropriate identified obstacle, or some combination thereof within the first scene. The first sensor data may include ambient light, environment illumination, other data for HD maps.

The network module may receive second sensor data representative of the second scene. The network module may receive the second sensor data from a surveillance system, a closed-circuit television system, a second vehicle, or some combination thereof. The second sensor data may include a time, a location, ambient solar radiation, or some combination thereof corresponding to the second scene. The second sensor data may include an estimated illumination value for each route segment corresponding to the second scene. The second sensor data may include a road marker, a lamp post, an identified object, or any other appropriate identified obstacle within the second scene. The second sensor data may include ambient light, environment illumination, other data for HD maps.

The network module may generate the illumination map. The illumination map may include route segments corresponding to the navigation area. The illumination map may include a set of probability values for good illumination dependent on the location, the time of the day and the weather conditions. The illumination map may include the probability of solar radiation value for each of the route segments based on the first sensor data and the second sensor data. The probability of solar radiation value for each of the route segments may include an averaged probability of solar radiation value for a corresponding route segment.

The network module may average the estimated value for each route segment over the first sensor data and the second sensor data. The network module may determine the probability of solar radiation value for each of the route segments by averaging the estimated value for each route segment over a period of time. The network module may determine the probability of solar radiation value for each of the route segments using a machine learning algorithm or an artificial intelligence algorithm. The machine learning algorithm or the artificial intelligence algorithm may be selected based on a surface type of the corresponding route segment, a physical location of the area, or some combination thereof.

The network module may receive the request to generate the navigation route for the vehicle from the start point to the end point within the navigation area. The network module may determine multiple navigable routes from the start point to the end point using the route segments within the illumination map. The network module may determine the overall probability of solar radiation value for each of the navigable routes based on the probability of solar radiation value for each route segment associated with a corresponding navigable route.

The network module may determine an amount of time to traverse each of the navigable routes. The network module may determine the overall probability of solar radiation value for each of the navigable routes further based on the amount of time to traverse the corresponding navigable route.

The network module may receive input data that includes weather data representative of weather patterns in the area, a current season of the area, a corresponding time of day of the area, current traffic patterns of the route segments, historical traffic patterns of the route segments, or some combination thereof. The network module may determine the overall probability of solar radiation value for each of the navigable routes further based on the input data.

The network module may identify the probability of solar radiation value for each route segment associated with the corresponding navigable route using the illumination map. The network module may also sum the probability of solar radiation value for each route segment associated with the corresponding navigable route. The overall probability of solar radiation value for the corresponding navigable route may include the summed probability of solar radiation value for each route segment associated with the corresponding navigable route.

The network module may identify the navigable route that corresponds to the greatest overall probability of solar radiation value as the illumination route. The network module may generate the instruction to the display within the vehicle to display the illumination route as the navigable route for the vehicle. If the vehicle includes an autonomous vehicle, the network module may cause the vehicle to traverse the illumination route.

A vehicle navigation device may include a processor that includes the navigation module. The navigation module may receive the illumination map that includes route segments. The illumination map may include the probability of solar radiation value for each of the route segments. The navigation module may also determine navigable routes from the start point to the end point using the route segments. In addition, the navigation module may determine the overall probability of solar radiation value for each of the navigable routes based on the probability of solar radiation value for each route segment associated with a corresponding navigable route. Further, the navigation module may identify the navigable route as the illumination route if the corresponding overall probability of solar radiation value fulfills a predefined criterion.

As used in the present disclosure, terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to aspects containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although aspects of the present disclosure have been described in detail, various changes, substitutions, and alterations could be made hereto without departing from the spirit and scope of the present disclosure.

What is claimed is:

1. A vehicle navigation device comprising a processor configured to:
   receive an illumination map, the illumination map comprising:
      a plurality of route segments corresponding to an area; and
      for each route segment of the plurality of route segments, a corresponding probability of solar radiation value for the each route segment, wherein the corresponding probability of solar radiation value indicates a map-based probably of exposure of a vehicle to solar radiation within the each route segment;
   receive a request to generate a navigation route for a vehicle from a start point to an end point within the area;
   determine a plurality of navigable routes from the start point to the end point based on the plurality of route segments;
   determine, for each corresponding navigable route of the plurality of navigable routes, an overall probability value based on the corresponding probability of solar radiation value for each route segment within the corresponding navigable route;
   identify, as an illumination route, one of the plurality of navigable routes based on the overall probability value; and
   generate an instruction to a display device to display the illumination route for the vehicle;
   receive sensor data representative of an image of a scene proximate the vehicle from a camera mounted on the vehicle, wherein the scene is located within at least one of the plurality of route segments along the illumination route;
   determine a threshold value for identifying illuminated pixels;
   identify the illuminated pixels within the image based on the threshold value for pixel illumination;
   identify illuminated pixels within the image based on a threshold value for pixel illumination;
   determine, based on the illuminated pixels, an illumination value at a physical location within the scene, wherein the illumination value indicates a sensor-estimated probably of exposure to solar radiation of the vehicle at the physical location; and
   update, based on the illumination value, the illumination route to include the physical location.

2. The vehicle navigation device of claim 1, wherein the processor configured to determine the overall probability value comprises the processor configured to:
   identify a set of corresponding probability of solar radiation values from the illumination map for each route segment of the plurality of route segments that are within the corresponding navigable route; and
   sum the set of corresponding probability of solar radiation values to arrive at the overall probability value of the corresponding navigable route.

3. The vehicle navigation device of claim 1, wherein:
   the processor is further configured to determine, for each corresponding navigable route of the plurality of navigable routes, an amount of time to traverse the corresponding navigable route; and
   the overall probability value for the corresponding navigable route is further based on the amount of time to traverse the corresponding navigable route.

4. The vehicle navigation device of claim 1, wherein the processor configured to update the illumination route comprises the processor configured to:
   determine an intra-route update for the at least one of the plurality of route segments, wherein the intra-route update comprises a lane change within the at least one of the plurality of route segments to include the physical location.

5. The vehicle navigation device of claim 4, wherein the processor is configured to determine the lane change based on the illumination value at the physical location being greater than the corresponding probability of solar radiation value of the at least one of the plurality of route segments.

6. The vehicle navigation device of claim 1, wherein the vehicle comprises an autonomous vehicle and the processor is further configured to cause the vehicle to traverse the illumination route.

7. The vehicle navigation device of claim 1, wherein:
   the request to generate the navigation route comprises a request to identify an illumination parking spot within a parking lot, wherein the parking lot is associated with at least one associated route segment of the plurality of route segments;
   the processor is further configured to:
   receive second sensor data representative of the parking lot from the camera;
   identify unoccupied parking spots within the parking lot based on a pre-defined parking layout and the second sensor data;
   determine, for each unoccupied parking spot of the unoccupied parking spots, a corresponding parking illumination value based on the second sensor data, wherein the corresponding parking illumination value indicates a sensor-estimated probably of exposure to solar radiation of the vehicle in the each unoccupied parking spot;
   determine, for each unoccupied parking spot of the unoccupied parking spots, an overall parking probability of solar radiation value based on the corresponding parking illumination value and the corresponding probability of solar radiation value of the at least one associated route segment; and identify the illumination parking spot from among the unoccupied parking spots based on a greatest one of the overall parking probability of solar radiation values; and cause the display device to display the illumination parking spot.

8. The vehicle navigation device of claim 1, wherein the processor is configured to receive second sensor data representative of the scene from a second vehicle that is different from the vehicle, wherein the illumination value is further based on the second sensor data.

9. The vehicle navigation device of claim 8, wherein the illumination value comprises an average illumination value over a period of time, wherein the processor is configured to:
receive second sensor data representative of the scene from a second camera that is different from the camera; and
determine a second illumination value based on the second sensor data, wherein the average illumination value is an average of the illumination value and the second illumination value over the period of time.

10. The vehicle navigation device of claim 1, wherein:
the processor is configured to determine the illumination value based on a machine learning algorithm, wherein the processor is configured to select the machine learning algorithm based on a surface type of the at least one of the plurality of route segments and a physical location of the area.

11. The vehicle navigation device of claim 1, wherein:
the processor is further configured to determine an amount of time to traverse each navigable route of the plurality of navigable routes; and
the overall probability value for each navigable route of the plurality of navigable routes is further based on the amount of time to traverse the corresponding navigable route.

12. The vehicle navigation device of claim 1, wherein:
the processor is further configured to receive input data comprising at least one of weather data representative of weather patterns in the area, a current season of the area, a corresponding time of day of the area, current traffic patterns of the plurality of route segments, and historical traffic patterns of the plurality of route segments; and
the overall probability value for each navigable route of the plurality of navigable routes is further based on the input data.

13. The vehicle navigation device of claim 1, wherein the processor is configured to receive second sensor data representative of the scene from at least one of a surveillance system and a closed-circuit television system, wherein the illumination value is further based on the second sensor data.

14. A system, comprising:
means to receive an illumination map, the illumination map comprising:
a plurality of route segments corresponding to an area; and
for each route segment of the plurality of route segments, a probability of solar radiation value for the each route segment;
means to receive a request to generate a navigation route for a vehicle from a start point to an end point within the area;
means to determine a plurality of navigable routes from the start point to the end point based on the plurality of route segments;
means to determine, for each corresponding navigable route of the plurality of navigable routes, an overall probability value based on the corresponding probability of solar radiation value for each route segment within the corresponding navigable route;
means to identify, as an illumination route, one of the plurality of navigable routes based on its overall probability value being greater than remaining ones of the plurality of navigable routes;
means to cause a display device to display the illumination route within the vehicle;
means to receive sensor data representative of an image of a scene proximate the vehicle from a camera mounted on the vehicle, wherein the scene is located within at least one of the plurality of route segments along the illumination route;
means to determine a threshold value for identifying illuminated pixels;
means to identify the illuminated pixels within the image based on the threshold value;
means to identify illuminated pixels within the image based on a threshold value for pixel illumination;
means to determine, based on the illuminated pixels, an illumination value at a physical location within the scene, wherein the illumination value indicates a sensor-estimated probably of exposure to solar radiation of the vehicle at the physical location; and
means to update, based on the illumination value, the illumination route to include the physical location.

* * * * *